United States Patent
Yamaguchi

(10) Patent No.: US 11,634,582 B2
(45) Date of Patent: Apr. 25, 2023

(54) CURABLE WHITE SILICONE FORMULATION, A REFLECTIVE MATERIAL FOR OPTICAL SEMICONDUCTOR MODULE AND OPTICAL SEMICONDUCTOR DEVICE

(71) Applicant: DuPont Toray Specialty Materials Kabushiki Kaisha, Tokyo (JP)

(72) Inventor: Sosuke Yamaguchi, Chiba (JP)

(73) Assignee: DuPont Toray Specialty Materials Kabushiki Kaisha, Tokyo (JP)

( * ) Notice: Subject to any disclaimer, the term of this patent is extended or adjusted under 35 U.S.C. 154(b) by 106 days.

(21) Appl. No.: 17/111,747

(22) Filed: Dec. 4, 2020

(65) Prior Publication Data
US 2021/0171772 A1  Jun. 10, 2021

(30) Foreign Application Priority Data
Dec. 5, 2019 (JP) .............................. JP2019-220401

(51) Int. Cl.
*C08L 83/08* (2006.01)

(52) U.S. Cl.
CPC .......... *C08L 83/08* (2013.01); *C08L 2205/025* (2013.01)

(58) Field of Classification Search
CPC ............................ C08L 83/08; C08L 2205/025
See application file for complete search history.

(56) References Cited

U.S. PATENT DOCUMENTS

| 8,455,899 | B2 | 6/2013 | Taguchi et al. | |
|---|---|---|---|---|
| 9,902,811 | B2 | 2/2018 | Dent et al. | |
| 2014/0179870 | A1* | 6/2014 | Kondo | C08L 83/06 524/866 |
| 2015/0376344 | A1* | 12/2015 | Dent | H01L 33/50 252/301.36 |
| 2016/0208138 | A1* | 7/2016 | Nishijima | C09D 5/22 |
| 2017/0190879 | A1* | 7/2017 | Iimura | C08L 83/04 |
| 2017/0204252 | A1* | 7/2017 | Iimura | H01L 23/29 |
| 2020/0270500 | A1* | 8/2020 | Ota | C08J 3/075 |
| 2021/0079222 | A1* | 3/2021 | Schmidt | C08G 77/80 |
| 2021/0198490 | A1* | 7/2021 | Yamaguchi | C08G 77/12 |
| 2022/0017746 | A1* | 1/2022 | Horie | C08L 83/04 |
| 2022/0064445 | A1* | 3/2022 | Oka | C08G 77/20 |
| 2022/0064447 | A1* | 3/2022 | Yamazaki | C08K 9/06 |
| 2022/0169894 | A1* | 6/2022 | Yamazaki | C08L 83/04 |

FOREIGN PATENT DOCUMENTS

| JP | 2011225828 A | 11/2011 |
|---|---|---|
| JP | 2016513165 A | 5/2016 |
| WO | 2006001458 A2 | 1/2006 |

OTHER PUBLICATIONS

English language abstract for JP 2011-225828 extracted from espacenet.com database on Dec. 10, 2020, 2 pages.
English language abstract for JP 2016-513165 extracted from espacenet.com database on Dec. 10, 2020, 2 pages.

* cited by examiner

*Primary Examiner* — Ellen M McAvoy
(74) *Attorney, Agent, or Firm* — Howard & Howard Attorneys PLLC

(57) ABSTRACT

A curable white silicone composition that is capable of forming a cured product having a high optical reflectance as well as exceptional light resistance is provided.
The curable white silicone composition includes (A) an organopolysiloxane having at least 2 alkenyl groups per molecule, (B) a cerium-containing organopolysiloxane, (C) a white pigment, and (D) a curing catalyst.

16 Claims, No Drawings

CURABLE WHITE SILICONE FORMULATION, A REFLECTIVE MATERIAL FOR OPTICAL SEMICONDUCTOR MODULE AND OPTICAL SEMICONDUCTOR DEVICE

CROSS-REFERENCE TO RELATED APPLICATION

The present application claims priority to and all the benefits of Japanese Application No. 2019-220401 filed on Dec. 5, 2019, which is hereby expressly incorporated herein by reference in its entirety.

DESCRIPTION

Technical Field

The present disclosure relates to a white curable silicone composition, and more specifically relates to a white curable silicone composition which can be preferably used as a reflective material for optical semiconductor devices. The present disclosure also relates to a reflective material for an optical semiconductor device which comprises a cured product of said white curable silicone composition, and to an optical semiconductor device equipped with the reflective material.

Background Technology

When curable silicone compositions are cured, they form cured products having excellent heat resistance, cold resistance, electrical insulation, weather resistance, water repellency, and transparency, and are therefore used in a wide range of industrial fields. Compared to other organic materials, the cured products of this curable silicone composition are less prone to discolouration, with less change in their physical properties, thus making them suitable for optical materials.

For example, Patent Document 1 discloses a curable silicone composition comprising at least: (A) a linear organopolysiloxane having at least two alkenyl groups per molecule; (B) an organopolysiloxane represented by the following average unit formula: $(R^1SiO_{3/2})_a(R^1{}_2SiO_{2/2})_b(R^1{}_3SiO_{1/2})_c(SiO_{4/2})_d(XO_{1/2})_e$ (in the formula, $R^1$ are each independently a $C_{1-12}$ alkyl group, a $C_{2-12}$ alkenyl group, a $C_{6-20}$ aryl group, a $C_{7-20}$ aralkyl group, or any of these groups in which some or all of the hydrogen atoms are substituted with halogen atoms, except that at least two $R^1$ per molecule are alkenyl groups; X is a hydrogen atom or an alkyl group; a is a number from 0 to 0.3; b is 0 or a positive number; c is a positive number; d is a positive number; e is a number from 0 to 0.4; and a+b+c+d=1, c/d is a number from 0 to 10, and b/d is a number from 0 to 0.5), (C) an organopolysiloxane having at least two silicon-bonded hydrogen atoms per molecule; (D) a cerium-containing organopolysiloxane, and € a hydrosilylation reaction catalyst. The document also indicates that the above-mentioned curable silicone composition can be used as a curable silicone composition for an optical semiconductor device that must be transparent, and specifically indicates that the above-mentioned curable silicone composition can be used as a curable silicone composition for sealing, covering, or adhering an optical semiconductor element.

Patent Document 2 discloses a resin composition characterized by comprising 100 parts by mass of an organic resin and 50 to 1000 parts by mass of an inorganic filler, wherein 10 to 100% by mass of the inorganic filler is a rare earth element oxide, and indicates that this resin composition can be used to provide a reflector for a light-emitting semiconductor element and a light-emitting semiconductor device that have a high optical reflectance and minimal loss of brightness.

DOCUMENTS OF THE PRIOR ART

Patent Documents

[Patent Document 1] Japanese Translation of PCT International Application Publication No. 2016-513165
[Patent document 2] Japanese Unexamined Patent Publication No. 2011-225828

SUMMARY OF THE INVENTION

Problem to be Solved by the Invention

However, when the cured product of a conventional curable silicone composition is used as a reflective material for optical semiconductor devices, there are problems in that the light resistance is poor, and the reflective material ends up cracking or shrinking as a result of long-term use.

An object of the present disclosure is to provide a curable white silicone composition that is capable of forming a cured product having a high optical reflectance as well as exceptional light resistance.

Another object of the present disclosure is to provide a reflective material for an optical semiconductor device that has a high optical reflectance as well as exceptional light resistance. Yet another object of the present disclosure is to provide an optical semiconductor that is equipped with the reflective material for an optical semiconductor device of the present disclosure.

Solving the Problem

As a result of extensive research to solve the above-mentioned problems, the inventors arrived at the present disclosure upon discovering that, surprisingly, cerium-containing organopolysiloxanes can provide a cured product of a silicone composition with exceptional light resistance while preserving high optical reflectance.

The present disclosure thus relates to a curable white silicone composition, comprising
(A) an organopolysiloxane having at least 2 alkenyl groups per molecule,
(B) a cerium-containing organopolysiloxane,
(C) a white pigment, and
(D) a curing catalyst.

The concentration of cerium atoms in the (B) cerium-containing organopolysiloxane can be 0.5 to 1,000 ppm.

The (C) white pigment may have a mean particle size of 0.1 to 5 μm.

The content of the (C) white pigment can be 10 to 80% by mass with respect to the total mass of the composition.

The (D) curing catalyst preferably comprises a hydrosilylation reaction catalyst.

The (A) organopolysiloxane preferably comprises a resinous organopolysiloxane.

The resinous organopolysiloxane can be represented by $(R^1{}_3SiO_{1/2})_f(SiO_{4/2})_g(XO_{1/2})_h$     (A-2) average unit formula:

(in the formula, $R^1$ are the same or different optionally halogen-substituted monovalent hydrocarbon groups, except that at least two $R^1$ are alkenyl groups, f is an integer from 5 to 1,000, g is an integer from 5 to 1,000, X is a hydrogen atom or an alkyl group, and h is an integer from 0 to 10).

The (A) organopolysiloxane preferably comprises a resinous organopolysiloxane and a linear organopolysiloxane, wherein the linear organopolysiloxane/resinous organopolysiloxane content ratio is 1 or more.

The present disclosure also relates to a reflective material for an optical semiconductor device, comprising the cured product of the curable silicone composition of the present disclosure.

The present disclosure furthermore relates to an optical semiconductor device that is equipped with the reflective material for an optical semiconductor device of the present disclosure.

Effects of the Invention

The curable white silicone composition of the present disclosure makes it possible to form a cured product having exceptional light resistance while preserving the high optical reflectance. The reflective material for an optical semiconductor device of the present disclosure also makes it possible to provide a reflective material having exceptional light resistance while preserving the high optical reflectance.

MODE OF THE INVENTION

[Curable White Silicone Composition]

The curable white silicone composition according to the present disclosure comprises at least (A) an organopolysiloxane having at least 2 alkenyl groups per molecule, (B) a cerium-containing organopolysiloxane, (C) a white pigment, and (D) a curing catalyst.

The curable white silicone composition of the present disclosure is described in detail below.

(A) Organopolysiloxane having at least 2 alkenyl groups per molecule Component (A), which is a principal component of the present composition, is a curable organopolysiloxane having at least two alkenyl groups per molecule. The curable white silicone composition according to the present disclosure may comprise one type of the (A) organopolysiloxane, and may comprise two or more types of the (A) organopolysiloxane.

Examples of the molecular structure of component (A) are linear, linear with some branching, branched, cyclic, and 3D network structures. Component (A) can be one organopolysiloxane having such a molecular structure, or a mixture of 2 or more such organopolysiloxanes. The curable white silicone composition of the present disclosure preferably contains a linear organopolysiloxane and an organopolysiloxane having a 3D network structure as component (A).

Examples of alkenyl groups in component (A) include $C_{2-12}$ alkenyl groups such as vinyl, allyl, butenyl, pentenyl, hexenyl, heptenyl, octenyl, nonenyl, decenyl, undecenyl, or dodecenyl groups; vinyl groups are preferred. Examples of silicon atom-bonded groups other than alkenyl groups in component (A) include $C_{1-12}$ alkyl groups such as methyl, ethyl, propyl, isopropyl, n-butyl, isobutyl, tert-butyl, n-pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, or bromine atoms. The silicon atoms in component (A) may have a small quantity of hydroxyl groups or alkoxy groups such as a methoxy or ethoxy groups, provided that the objectives of the present disclosure are not thereby compromised.

Component (A) preferably contains at least one type of resinous organopolysiloxane. In the present specification, resinous organopolysiloxanes refer to organopolysiloxanes that have a branched molecular structure or a 3D network structure. In one embodiment, the molecular structure of the resinous organopolysiloxane of component (A) contains at least one siloxane unit (T unit) represented by $RSiO_{3/2}$ and/or siloxane unit (Q unit) represented by $SiO_{4/2}$. In one embodiment, the molecular structure of the resinous organopolysiloxane of component (A) contains a Q unit, but not a T unit. In another embodiment, when component (A) is an aryl group-containing resinous organopolysiloxane, the molecular structure of component (A) contains a T unit, but not a Q unit.

In one embodiment, the proportion of Q units in the molecular structure of the resinous organopolysiloxane of component (A) is preferably 0.1 or more, more preferably 0.2 or more, even more preferably 0.3 or more, and particularly more preferably 0.4 or more. In a preferred embodiment, the proportion of Q units in the molecular structure of the resinous organopolysiloxane of the present disclosure is 0.9 or less, preferably 0.8 or less, more preferably 0.7 or less, and even more preferably 0.6 or less. In one embodiment, the proportion of T units in the molecular structure of the resinous organopolysiloxane of component (A) is 0.2 or less, preferably 0.1 or less, and more preferably no T units. The above-mentioned proportions of T units and Q units can be calculated based on the amount of siloxane units represented by general formula $R_3SiO_{1/2}$ (M units), siloxane units represented by general formula $R_2SiO_{2/2}$ (D units), siloxane units represented by general formula $RSiO_{3/2}$ (T units), and siloxane units represented by formula $SiO_{4/2}$ (Q units) in the resinous organopolysiloxane.

In another embodiment, when the resinous organopolysiloxane of component (A) is an aryl group-containing resinous organopolysiloxane, the proportion of T units in the molecular structure of the resinous organopolysiloxane of component (A) is preferably 0.1 or more, more preferably 0.3 or more, even more preferably 0.5 or more, and particularly more preferably 0.7 or more. In a preferred embodiment, the proportion of T units in the molecular structure of the aryl group-containing resinous organopolysiloxane of the present disclosure is 0.95 or less, preferably 0.9 or less, more preferably 0.85 or less, and even more preferably 0.8 or less. In one embodiment, the proportion of Q units in the molecular structure of the resinous organopolysiloxane of component (A) is 0.2 or less, preferably 0.1 or less, and more preferably no Q units.

The proportion of M units in the molecular structure of the resinous organopolysiloxane of component (A) is preferably 0.1 or more, more preferably 0.2 or more. In a preferred embodiment, the proportion of M units in the molecular structure of the resinous organopolysiloxane of the present disclosure is 0.9 or less, preferably 0.8 or less, more preferably 0.7 or less, and particularly preferably 0.6 or less. In one embodiment, the proportion of D units in the molecular structure of the resinous organopolysiloxane of component (A) is 0.2 or less, preferably 0.1 or less, and more preferably no D units. The above-mentioned proportions of M units and D units can be calculated based on the amount of siloxane units represented by general formula $R_3SiO_{1/2}$ (M units), siloxane units represented by general formula $R_2SiO_{2/2}$ (D units), siloxane units represented by general formula $RSiO_{3/2}$ (T units), and siloxane units represented by formula $SiO_{4/2}$ (Q units) in the resinous organopolysiloxane.

The alkenyl group content in the resinous organopolysiloxane of component (A) (mol % of alkenyl groups in all silicon atom-bonded functional groups of the resinous organopolysiloxane) can be designed as desired, but should be 0.5 mol % or more, preferably 1 mol % or more, more preferably 2 mol % or more, even more preferably 3 mol % or more, preferentially 4 mol % or more, and particularly preferably 5 mol % or more or 6 mol % or more, and can be 30 mol % or less, preferably 25 mol % or less, more preferably 20 mol % or less, and preferentially 18 mol % or less. The alkenyl group content can be determined by analysis such as Fourier transform infrared spectrophotometry (FT-IR) or nuclear magnetic resonance (NMR).

In one embodiment of the present disclosure, the resinous organopolysiloxane of component (A) can be represented by

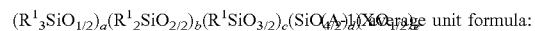

$(R^1{}_3SiO_{1/2})_a(R^1{}_2SiO_{2/2})_b(R^1SiO_{3/2})_c(SiO_{4/2})_d(XO_{1/2})_e$ average unit formula:

(in the formula, $R^1$ are the same or different optionally halogen-substituted monovalent hydrocarbon groups, except that at least two $R^1$ per molecule are alkenyl groups, X is a hydrogen atom or an alkyl group, a, b, c, d, and e are $0 \leq a \leq 1.0$, $0 \leq b \leq 1.0$, $0 \leq c \leq 0.9$, $0 \leq d \leq 0.5$, and $0 \leq e \leq 0.4$, a+b+c+d=1.0, and c+d>0).

Examples of the optionally halogen-substituted monovalent hydrocarbon groups represented by $R^1$ in the above formula include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; $C_{2-12}$ alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^1$ may also be a hydroxyl group or an alkoxy group such as methoxy or ethoxy, in small amounts, provided that this does not adversely affect the aim of the present disclosure. $R^1$ is preferably selected from phenyl, $C_{1-6}$ alkyl or cycloalkyl, or $C_{2-6}$ alkenyl groups, and is more preferably a $C_{1-6}$ alkyl group or a phenyl group.

In average unit formula (A-1), X is a hydrogen atom or an alkyl group. Preferred examples of alkyl groups represented by X include $C_{1-3}$ alkyl groups, specifically, methyl, ethyl, and propyl groups.

In average unit formula (A-1), a is preferably in the range of $0.1 \leq a \leq 0.9$, more preferably in the range of $0.15 \leq a \leq 0.8$, even more preferably in the range of $0.2 \leq a \leq 0.7$, and particularly in the range of $0.25 \leq a \leq 0.6$. In average unit formula (A-1), b is preferably in the range of $0 \leq b \leq 0.3$, more preferably $0 \leq b \leq 0.2$, and particularly in the range of $0 \leq b \leq 0.1$. In average unit formula (A-1), c is preferably in the range of $0 \leq c \leq 0.9$, more preferably $0 \leq c \leq 0.85$, and particularly in the range of $0 \leq c \leq 0.8$. In average unit formula (A-1), d is preferably in the range of $0.1 \leq d \leq 0.9$, more preferably in the range of $0.2 \leq d \leq 0.8$, even more preferably in the range of $0.3 \leq d \leq 0.7$, and particularly in the range of $0.4 \leq d \leq 0.6$. In average unit formula (A-1), e is preferably in the range of $0 \leq e \leq 0.3$, more preferably $0 \leq e \leq 0.2$, and particularly in the range of $0 \leq e \leq 0.1$.

The resinous organopolysiloxane of component (A) preferably comprises M units and Q units, and more preferably consists of only M units and Q units. The ratio of M units and Q units is not particularly limited, but the ratio of M units to Q units is preferably in the range of 0.5 to 3, and more preferably in the range of 0.8 to 2. That is because a cured product having good mechanical properties is obtained when the ratio of M units to Q units is at or above the lower limit of the above range, and the compatibility with component (A) is better when the ratio is at or below the upper limit.

The resinous organopolysiloxane of component (A) can therefore be represented by

$(R^1{}_3SiO_{1/2})_f(SiO_{4/2})_g(XO_{1/2})_h$ (A-2) average unit formula:

(In the formula, $R^1$ is the same as above, except that at least two $R^1$ are alkenyl groups; f is an integer of 5 to 1,000, preferably an integer of 10 to 500, more preferably an integer of 20 to 100, and even more preferably an integer of 25 to 75; g is an integer of 5 to 1,000, preferably an integer of 10 to 500, more preferably an integer of 20 to 100, and even more preferably an integer of 25 to 75; X is the same as above; and h is an integer of 0 to 10.).

In another embodiment, the resinous organopolysiloxane of component (A) preferably comprises M units and T units, and more preferably consists of only M units and T units. The ratio of M units and T units is not particularly limited, but the ratio of M units to T units is preferably in the range of 0.1 to 1, and more preferably in the range of 0.2 to 0.5. That is because a cured product having good mechanical properties is obtained when the ratio of M units to T units is at or above the lower limit of the above range, and the compatibility with component (A) is better when the ratio is at or below the upper limit.

The resinous organopolysiloxane of component (A) can therefore be represented by

$(R^1{}_3SiO_{1/2})_i(R^2SiO_{3/2})_j(XO_{1/2})_k$ (A-3) average unit formula:

(In the formula, $R^1$ is the same as above, except that at least two $R^1$ are alkenyl groups; $R^2$ is the same as $R^1$ above; i is an integer of 5 to 1,000, preferably an integer of 10 to 500, more preferably an integer of 20 to 100, and even more preferably an integer of 25 to 75; j is an integer of 5 to 1,000, preferably an integer of 10 to 500, more preferably an integer of 20 to 100, and even more preferably an integer of 25 to 75; X is the same as above; and k is an integer of 0 to 10.).

When the resinous organopolysiloxane of component (A) comprises an aryl group, the content (mol % of aryl groups in all silicon atom-bonded functional groups of the resinous organopolysiloxane) can be designed as desired, but should be 5 mol % or more, preferably 10 mol % or more, more preferably 20 mol % or more, even more preferably 30 mol % or more, preferentially 35 mol % or more, and particularly preferably 40 mol % or more or 45 mol % or more, and can be 75 mol % or less, preferably 70 mol % or less, more preferably 65 mol % or less, and preferentially 60 mol % or less. The aryl group content can be determined by analysis such as Fourier transform infrared spectrophotometry (FT-IR) or nuclear magnetic resonance (NMR).

The curable white silicone composition of the present disclosure preferably comprises a linear organopolysiloxane as component (A).

Examples of this kind of component (A) include: dimethylpolysiloxane capped at both ends with dimethylvinylsiloxy groups, dimethylpolysiloxane capped at both ends with diphenylvinylsiloxy groups, dimethylsiloxane-methylphenylsiloxane copolymers capped at both ends with dimethylvinylsiloxy groups, dimethylsiloxane-diphenylsiloxane copolymers capped at both ends with dimethylvinylsiloxy groups, dimethylsiloxane-methylphenylsiloxane copolymers capped at both ends with diphenylvinylsiloxy groups, dimethylsiloxane-methylvinylsiloxane copolymers capped at both ends with dimethylvinylsiloxy groups, dimethylsiloxane-methylphenylsiloxane-methylvinylsiloxane copolymers capped at both ends with dimethylvinylsiloxy groups, dimethylsiloxane-diphenylsiloxane-methylvinylsiloxane copolymers capped at both ends with dimethylvinylsiloxy groups, methylvinylpolysiloxane capped at both ends with trimethylsiloxy groups, methylvinylsiloxane-methylphenylsiloxane copolymers capped at both ends with trimethylsiloxy groups, methylvinylsiloxane-diphenylsiloxane copolymers capped at both ends with trimethylsiloxy groups, and dimethylsiloxane-methylvinylsiloxane copolymers capped at both ends with trimethylsiloxy groups.

The alkenyl group content in the linear organopolysiloxane of component (A) (mol % of alkenyl groups in all silicon atom-bonded functional groups of the linear organopolysiloxane) can be designed as desired, but should be 0.1 mol % or more, preferably 0.2 mol % or more, more preferably 0.3 mol % or more, even more preferably 0.4 mol % or more, and preferentially 0.5 mol % or more, and can be 10 mol % or less, preferably 8 mol % or less, more preferably 6 mol % or less, and preferentially 5 mol % or less. The alkenyl group content can be determined by analysis such as Fourier transform infrared spectrophotometry (FT-IR) or nuclear magnetic resonance (NMR).

The linear organopolysiloxane of component (A) can be represented by

   (A-3) general formula:

(in the formula, $R^1$ is the same as above, except that at least two $R^1$ are alkenyl groups; m is an integer of 5 to 1,000, preferably an integer of 10 to 500, more preferably an integer of 25 to 300, and even more preferably an integer of 50 to 250.).

When the linear organopolysiloxane of component (A) comprises an aryl group, the aryl group content (mol % of aryl groups in all silicon atom-bonded functional groups of the linear organopolysiloxane) can be designed as desired, but should be 10 mol % or more, preferably 20 mol % or more, more preferably 30 mol % or more, even more preferably 35 mol % or more, and preferentially 40 mol % or more, and can be 70 mol % or less, preferably 60 mol % or less, more preferably 55 mol % or less, and preferentially 50 mol % or less. The aryl group content can be determined by analysis such as Fourier transform infrared spectrophotometry (FT-IR) or nuclear magnetic resonance (NMR).

The curable white silicone composition of the present disclosure preferably contains both a resinous organopolysiloxane and a linear organopolysiloxane as component (A). The content ratio of the resinous organopolysiloxane and linear organopolysiloxane is not particularly limited, but the linear organopolysiloxane/resinous organopolysiloxane content ratio is preferably 0.1 or more, more preferably 0.5 or more, even more preferably 1 or more, and particularly 1.5 or more. The linear organopolysiloxane/resinous organopolysiloxane content ratio of component (A) is also preferably 10 or less, more preferably 5 or less, and even more preferably 3 or less.

The content of component (A) is not particularly limited, but is preferably 10% by mass or more, more preferably 20% by mass or more, even more preferably 30% by mass or more, and particularly preferably 40% by mass or more, based on the total mass of the curable white silicone composition. In a preferred embodiment, the content of component (A) is 80% by mass or less, more preferably 70% by mass or less, and even more preferably 60% by mass or less, based on the total mass of the curable white silicone composition.

Component (A) may contain an aryl group, depending on the purpose. The inclusion of an aryl group allows a white cured product that has high hardness and strength and that is easier to handle to be obtained, although the light resistance is not as good as when no aryl group is included. The aryl group content in the total component (A) (mol % of aryl groups in all silicon atom-bonded functional groups of the organopolysiloxane) can be 20 mol % or more, and preferably 40 mol % or more of the total of component (A).

(B) Cerium-Containing Organopolysiloxane

The curable white silicone composition according to the present disclosure comprises a cerium-containing organopolysiloxane as component (B). The (B) cerium-containing organopolysiloxane is obtained, for example, by a reaction between cerium chloride or a cerium salt of a carboxylic acid and an alkali metal salt of a silanol group-containing organopolysiloxane. Thus, as used in the present specification, the term "cerium-containing organopolysiloxane" can mean one that is obtained by reacting a silanol group-containing organopolysiloxane and a cerium salt, where the silanol group of the organopolysiloxane and the cerium atom are chemically bonded.

Examples of the cerium salt of a carboxylic acid include cerium 2-ethylhexanoate, cerium naphthenate, cerium oleate, cerium laurate, and cerium stearate. An example of a cerium chloride is cerium trichloride.

Examples of alkali metal salts of silanol group-containing organopolysiloxanes include potassium salts of diorganopolysiloxanes capped at both ends with silanol groups, sodium salts of diorganopolysiloxanes capped at both ends with silanol groups, potassium salts of diorganopolysiloxanes capped at one end with a silanol group and capped at the other end with a triorganosiloxy group, and sodium salts of diorganopolysiloxanes capped at one end with a silanol group and capped at the other end with a triorganosiloxy group. Examples of silicon atom-bonded groups in these organopolysiloxanes include $C_{1-12}$ alkyl groups such as methyl, ethyl, propyl, isopropyl, n-butyl, isobutyl, tert-butyl, n-pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, or bromine atoms.

The above reaction is carried out at room temperature or while heated in an alcohol such as methanol, ethanol, isopropanol, or butanol, an aromatic hydrocarbon such as toluene or xylene, an aliphatic hydrocarbon such as hexane or heptane, or an organic solvent such as mineral spirits, ligroin, or a petroleum ether. The resulting reaction product is preferably treated by distilling off organic solvents or low-boiling components or filtering off sediments as needed. A dialkyl formamide, hexa-alkyl phosphoamide, or the like may also be added to facilitate the reaction. The cerium atom content of the cerium-containing organopolysiloxane thus obtained is preferably within the range of 0.1 to 15% by mass.

The inventors perfected the present disclosure upon discovering that the cured product of a curable white silicone composition comprising the (B) cerium-containing organopolysiloxane can exhibit exceptional light resistance while preserving a high optical reflectance. It is not fully understood at this stage why the (B) cerium-containing organopolysiloxane can improve the light resistance of cured products of the curable white silicone composition, but it appears it might be the result of the inhibitory effect of the (B) cerium-containing organopolysiloxane on the photocatalyst activity of white pigments.

The content of component (B) is not particularly limited, but is preferably an amount such that the cerium atom mass units are in the range of 0.5 to 1,000 ppm, and more preferably 1 to 500 ppm, in the total mass of the composition.

(C) White Pigment

The curable white silicone composition according to the present disclosure comprises a white pigment as component (C). The (C) white pigment may comprise one kind of (C) white pigment, or may comprise two or more kinds of (C) white pigment.

Examples of (C) white pigments include metal oxides such as titanium oxide, aluminium oxide, zinc oxide, zirconium oxide and magnesium oxide; hollow fillers such as glass balloons and glass beads; and others such as barium sulfate, zinc sulfate, barium titanate, aluminium nitride, boron nitride, and antimony oxide. Titanium oxide is preferred because of its high optical reflectance and concealing properties. Aluminium oxide, zinc oxide, and barium titanate are also preferred because of their high optical reflectance in the UV region.

The white pigment may furthermore be surface-treated in order to increase the reflectance, whiteness, and light resistance. Examples of types of surface treatments include well-known surface treatments such as treatment with aluminium oxide, aluminium hydroxide, silica, zinc oxide, zirconium oxide, organic compounds, and siloxanes. The organic compounds are not particularly limited; examples include polyhydric alcohols, alkanolamines or derivatives thereof, organosilicon compounds such as organic siloxanes, higher fatty acids or metal salts thereof, and organometallic compounds. The method of surface treatment is not particularly limited, provided that it is a known method; examples of methods that can be used include (1) methods in which a white pigment that has already been surface treated is mixed into the silicone composition, and (2) methods in which a surface treatment agent is added separately from the white pigment into the silicone composition and reacted with the white pigment in the composition.

The surface treatment of the white pigment is not particularly limited, provided that it is a known treatment, but silica-free treatments are particularly preferred because of the particularly exceptional light resistance of the white cured product that is obtained. Organic substance-free treatments are more particularly preferred because of the high reflectance that can be preserved following heat resistance tests of the white cured white product that is obtained. The surface treatment of the white pigment can be analysed by using a method of analysis such as scanning electron microscopy with energy-dispersive X-ray analysis (SEM-EDX) or inductively coupled plasma mass spectrometry (ICP-MS).

The average particle size and configuration of component (C) are not particularly limited, but the mean particle size is preferably in the range of 0.05 to 10 μm, more preferably in the range of 0.1 to 5 μm, and particularly preferably in the range of 0.15 to 3 μm. As used in the present specification, the average particle size means the 50% integrated value of the particle size distribution, as determined by laser diffraction/scattering.

The content of component (C) in the present composition is not particularly limited, but is preferably 10% by mass or more, more preferably 20% by mass or more, even more preferably 30% by mass or more, and particularly preferably 40% by mass or more, with respect to the total mass of the present composition. That is because a component (C) content at or over the above lower limit will result in a cured product that has good optical reflectance. In a preferred embodiment, the components (C) content is 80% by mass or less, preferably 70% by mass or less, and more preferably 60% by mass or less, based on the total mass of the present composition.

(D) Curing Catalyst

The component (D) curing catalyst is a catalyst component for curing the component (A) organopolysiloxane. The curable white silicone composition according to the present disclosure may comprise one type of the (D) curing catalyst, and may contain two or more types of the (D) curing catalyst.

The component (D) curing catalyst can preferably be selected from (d1) hydrosilylation reaction catalysts, (d2) peroxides, and (d3) high energy radiation curing catalysts. The curable white silicone composition according to the present disclosure may comprise one type, and two or more types may be used in combination.

(d1) Hydrosilylation catalysts are catalysts for promoting the curing of hydrosilylation reaction-curable types of silicone compositions. Examples of component (d1) include platinum catalysts such as chloroplatinic acid, alcohol solutions of chloroplatinic acid, platinum-olefin complexes, platinum-1,3-divinyl-1,1,3,3-tetramethyldisiloxane complexes, and platinum-supporting powders; palladium catalysts such as tetrakis(triphenylphosphine)palladium, palladium black, and mixtures with triphenylphosphine; and rhodium catalysts; platinum catalysts are particularly preferred.

Component (d1) is blended in the amount that is needed to cure component (A), and is not particularly limited, but when a platinum catalyst is used, for example, the amount of platinum metal contained in the platinum catalyst is preferably in the range of 0.01 to 1000 ppm for practical purposes, and is particularly preferably in the range of 0.1 to 500 ppm, by weight unit, in the silicone composition.

Examples of (d2) peroxides include alkyl peroxides, diacyl peroxides, peroxide esters, and peroxide carbonates.

Examples of alkyl peroxides include dicumyl peroxide, di-tert-butyl peroxide, di-tert-butyl cumyl peroxide, 2,5-dimethyl-2,5-di (tert-butylperoxy)hexane, 1,3-bis (tert-butylperoxyisopropyl)benzene, and 3,6,9-triethyl-3,6,9-trimethyl-1,4,7-triperoxonane.

Examples of diacyl peroxides include benzoyl peroxide, lauroyl peroxide, and decanoyl peroxide. Examples of peroxide esters include 1,1,3,3-tetramethylbutyl peroxyneodecanoate, α-cumyl peroxyneodecanoate, tert-butyl peroxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-amyl peroxy-2-ethylhexanoate, tert-butyl peroxy-2-ethylhexanoate, tert-butyl peroxyisobutyrate, di-tert-butyl peroxyhexahydroterephthalate, tert-amyl peroxy-3,5,5-trimethylhexanoate, tert-butyl peroxy 3,5,5-trimethylhexanoate, tert-butyl peroxyacetate, tert-butyl peroxybenzoate, and di-butyl peroxytrimethyladipate.

Examples of peroxide carbonates include di-3-methoxybutyl peroxydicarbonate, di(2-ethylhexyl) peroxydicarbonate, diisopropyl peroxycarbonate, tert-butyl peroxyisopropylcarbonate, di(4-tert-butylcyclohexyl) peroxydicarbonate, dicetyl peroxydicarbonate, and dimyristyl peroxydicarbonate.

Component (d2) is blended in the amount that is needed to cure component (A), and is not particularly limited, but the amount may be in the range of 0.05 to 10 parts by mass, and preferably 0.10 to 5.0 parts by mass, with respect to 100 parts by mass of the component (A) organopolysiloxane component.

The (d3) high energy radiation curing catalyst can be selected, as appropriate, from conventionally known compounds that generate radicals when exposed to high energy radiation, including ultraviolet radiation, such as carbonyl compounds, organosulfur compounds, and azo compounds. Specific examples include acetophenone, propiophenone, benzophenone, xanthol, fluorene, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxyketal, 2-chlorothioxanthone, diethylacetophenone, 1-hydroxycyclohexyl phenyl ketone, 2-methyl[4-(methylthio)phenyl]2-morpholino-1-propanone, 2,2-dimethoxy-2-phenylacetophenone, and diethoxyacetophenone.

Component (d3) is blended in the amount that is needed to cure component (A), and is not particularly limited, but the amount may be in the range of 0.05 to 10 parts by mass, and preferably 0.10-5.0 parts by mass, with respect to 100 parts by mass of the component (A) organopolysiloxane component.

(E) Organohydrogenpolysiloxane

When the component (D) curing catalyst comprises an (al) hydrosilylation reaction catalyst, specifically, when the curing of the curable white silicone composition according to the present disclosure comprises a hydrosilylation reaction, the composition of the present disclosure can comprise component (E), an organohydrogenpolysiloxane having at least 2 silicon atom-bonded hydrogen atoms per molecule, as a cross linker. One organohydrogenpolysiloxane or a combination of 2 or more organohydrogenpolysiloxanes may be used as component (E).

Examples of the molecular structure of component (E) are linear, linear with some branching, branched, cyclic, and 3D network structures; linear structures are preferred. An organohydrogenpolysiloxane having only 1 kind of structure may be used, or organohydrogenpolysiloxanes having 2 or more kinds of structures may be used in combination as component (E).

The silicon-bonded hydrogen atoms of component (E) may be included at both ends of the molecular chain or in side chains other than both ends of the molecular chain. Examples of silicon atom-bonded groups other than hydrogen atoms in component (E) include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (E) may have a small quantity of hydroxyl groups or alkoxy groups such as a methoxy or ethoxy groups, provided that the objectives of the present disclosure are not thereby compromised.

Examples of this kind of component (E) include: dimethylpolysiloxane capped at both ends with dimethylhydrogensiloxy groups, dimethylsiloxane-methylphenylsiloxane copolymers capped at both ends with dimethylhydrogensiloxy groups, dimethylsiloxane-methylhydrogensiloxane copolymers capped at both ends with dimethylhydrogensiloxy groups, methylhydrogenpolysiloxane capped at both ends with trimethylsiloxy groups, dimethylsiloxane-methylhydrogensiloxane copolymers capped at both ends with trimethylsiloxy groups, organosiloxanes consisting of $H(CH_3)_2SiO_{1/2}$ units and $SiO_{4/2}$ units, and organopolysiloxanes consisting of $H(CH_3)_2SiO_{1/2}$ units, $(CH_3)_3SiO_{1/2}$ units, and $SiO_{4/2}$ units.

In a preferred embodiment, component (E) can be represented by

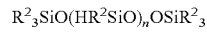  general formula (E-1):

(in the formula, $R^2$ is the same as $R^1$, n is a number in the range of 1 to 100, preferably 10 to 90, more preferably 20 to 80, and even more preferably 30 to 70.).

In another preferred embodiment, component (E) can be represented by

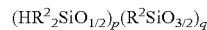  average unit formula (E-2):

(in the formula, $R^2$ is the same as $R^1$, p and q are numbers in the range of 1 to 100, preferably 10 to 90, more preferably 20 to 80, and even more preferably 30 to 70.).

Component (E) can contain an aryl group, preferably a phenyl group. When an aryl group is included, the aryl group content (mol % of aryl groups in all silicon atom-bonded functional groups of component (E)) can be designed as desired, but should be 1 mol % or more, preferably 5 mol % or more, more preferably 10 mol % or more, and even more preferably 15 mol % or more, and can be 40 mol % or less, preferably 30 mol % or less, more preferably 25 mol % or less, and preferentially 20 mol % or less. The aryl group content can be determined by analysis such as Fourier transform infrared spectrophotometry (FT-IR) or nuclear magnetic resonance (NMR).

When the curable white silicone composition of the present disclosure comprises component (E), the content of component (E) is not particularly limited but can, for example, be an amount resulting in 0.1 to 10 mols, preferably 0.5 to 5 mols, and particularly 0.8 to 1.2 mols of silicon atom-bonded hydrogen atoms in the component per 1 mol of silicon atom-bonding alkenyl groups in component (A). The content of silicon atom-bonded hydrogen atoms in component (E) can be determined by analysis such as Fourier transform infrared spectrophotometry (FT-IR) or nuclear magnetic resonance (NMR).

In another embodiment, when the curable white silicone composition of the present disclosure comprises component (E), the content of component (E) is in the range of 0.1 to 20% by mass, and preferably 0.5 to 15% by mass, with respect to the total mass of the composition of the present disclosure.

Optional components can be blended into the curable white silicone composition of the present disclosure, provided that the objectives of the present disclosure are not thereby compromised. Examples of optional components include acetylene compounds, organic phosphorus compounds, vinyl group-containing siloxane compounds, and hydrosilylation reaction inhibitors; as well as inorganic fillers other than white pigments, or inorganic fillers that have undergone a surface hydrophobic treatment with an organosilicon compound, organopolysiloxanes containing no silicon atom-bonded hydrogen atoms or silicon atom-bonded alkenyl groups, tackifiers, agents that confer heat resistance, agents that confer cold resistance, thermally conductive fillers, agents that confer flame retardance, agents that confer thixotropic properties, phosphors, and solvents.

Hydrosilylation inhibitors are components for suppressing the hydrosilylation of the silicone composition; specific examples are acetylene-based reaction inhibitors such as ethynylcyclohexanol, and amine-, carboxylic acid ester-, and phosphite ester-based reaction inhibitors. A reaction inhibitor is usually added in an amount of 0.001 to 5% by mass of the total composition.

Examples of inorganic fillers included fumed silica, crystalline silica, precipitated silica, silsesquioxane, magnesium oxide, iron oxide, aluminium hydroxide, magnesium carbonate, calcium carbonate, zinc carbonate, layered mica, diatomaceous earth, glass fibre and other inorganic fillers; as well as fillers such as these that have undergone a surface hydrophobic treatment with an organosilicon compound such as an organoalkoxysilane compound, an organochlorosilane compound, an organosilazane compound, or a low molecular weight siloxane compound. Silicone rubber powder, silicone resin powder and the like can also be incorporated. The inorganic filler may be blended in an amount of 40% by mass or less, preferably 30% by mass or less, more preferably 20% by mass or less, and particularly 10% by mass or less, of the composition.

Phosphors are widely used in light-emitting diodes (LEDs); examples of phosphors used are yellow-, red-, green-, and blue phosphors such as oxide phosphors, oxynitride phosphors, nitride phosphors, sulfide phosphors, oxysulfide phosphors, and fluoride phosphors, and mixtures of at least 2 of these. Examples of oxide phosphors are cerium ion-doped yttrium aluminium garnet (YAG) green to yellow phosphors; cerium ion-doped terbium aluminium garnet (TAG) yellow phosphors; and cerium and europium ion-doped silicate green to yellow phosphors. Examples of oxynitride phosphors are europium ion-doped silicon aluminium oxygen nitrogen (SiAlON) red-green phosphors. Examples of nitride phosphors are europium ion-doped calcium strontium aluminium silicon nitrogen (CaSrAlSiN) red phosphors. Examples of sulphide phosphors are copper ion- and aluminium ion-doped ZnS green phosphors. Examples of oxysulphide phosphors are europium ion-doped Y2O25 red phosphors. Examples of fluoride phosphors are KSF phosphors ($K_2SiF_6:Mn^{4+}$).

Examples of adhesiveness imparting agents are epoxy group-containing alkoxysilane, acrylic group-containing alkoxysilane, amino group-containing alkoxysilane, reaction condensates of silane coupling agents, organic titanium compounds, organic aluminium compounds, organic zirconium compounds, ethyl polysilicate [average molecular formula $Si_mO_{(m-1)}(OC_2H_5)_{2(m+1)}$ (in the formula, m is, on average, 5)], etc. Of these, the above-mentioned organic titanium compounds, reaction condensates of silane coupling agents, ethyl polysilicate [average molecular formula $Si_mO_{(m-1)}(OC_2H_5)_{2(m+1)}$ (in the formula, m is, on average, 5), $SiO_2$ content 40% by weight, viscosity 5 mPa s), and mixtures thereof, are preferred.

The curable white silicone composition of the present disclosure can be prepared by mixing the various components. The method of mixing the various components should be a conventionally known method, and is not particularly limited; a uniform mixture is usually obtained by simple mixing. When solid components such as inorganic filler are included as optional components, it is preferable to use a mixing device for the mixing. There are no particular limitations regarding this mixing device, and examples include single- and twin-screw continuous mixers, double roller mixers, Ross mixers, Hobart mixers, dental mixers, planetary mixers, kneader mixers, and Henschel mixers.

The curable white silicone composition of the present disclosure is cured to give a cured product having high optical reflectance in the visible light region, and is preferably 250 μm thick, with an optical reflectance of 90% or more, and more preferably 95% or more, in the visible light region.

As the cured product obtained by curing the curable white silicone composition of the present disclosure has a high optical reflectance and exceptional light resistance, the curable white silicone composition of the present disclosure is suitable for use as a light-reflective material, particularly a light-reflective material for an optical semiconductor device.

Reflective Material for Optical Semiconductor Device

The present disclosure also relates to a reflective material for an optical semiconductor device, that is obtained by curing the curable white silicone composition of the present disclosure. The reflective material for an optical semiconductor device of the present disclosure is obtained by curing the curable white silicone composition of the present disclosure, and thus has a high optical reflectance and exceptional light resistance. The optical semiconductor device is not particularly limited; examples include light-emitting diodes (LED), semiconductor lasers, photodiodes, phototransistors, solid-state imaging, and photoemitters and photoreceivers for photocouplers, and light emitting diodes (LED) are particularly preferred.

Optical Semiconductor Device

The optical semiconductor device of the present disclosure is equipped with the reflective material for an optical semiconductor device of the present disclosure. Examples of such optical semiconductor devices include light-emitting diodes (LED), semiconductor lasers, photodiodes, phototransistors, solid-state imaging, and photoemitters and photoreceivers for photocouplers, and light emitting diodes (LED) are particularly preferred. The optical semiconductor device of the present disclosure is equipped with the reflective material for an optical semiconductor device of the present disclosure, which has exceptional reflectance and light resistance, and thus has exceptional luminous efficiency and reliability.

EXAMPLES

The curable white silicone composition of the present disclosure is described in greater detail by means of the following examples and comparative examples.

The raw material components shown below were used in the following examples and comparative examples. Below, Me represents a methyl group, Vi represents a vinyl group, and Ph represents a phenyl group.

Component a-1: alkenyl group-containing resinous organopolysiloxane represented by average structural formula $(ViMe_2SiO_{1/2})_{10}(Me_3SiO_{1/2})_{40}(SiO_{4/2})_{50}$ Component a-2: linear alkenyl group-containing organopolysiloxane represented by general formula $ViMe_2SiO(Me_2SiO)_{150}OSiViMe_2$ Component a-3: alkenyl group-containing resinous organopolysiloxane represented by average structural formula $(ViMe_2SiO_{1/2})_{25}(PhSiO_{3/2})_{75}$ Component a-4: linear alkenyl group-containing organopolysiloxane represented by general formula ViMe$_2$SiO(PhMeSiO$_{2/2}$)$_{20}$SiOMe$_2$Vi Component b-1: cerium-containing dimethylpolysiloxane having a cerium content of 0.5% by mass Component c-1: titanium oxide (mean particle size of 0.25 μm, PX3788, by Sakai Chemical Industry Co. Ltd.)

Component c-2: zinc oxide (mean particle size of 0.6 μm, by Sakai Chemical Industry Co. Ltd.)

Component c-3: titanium oxide (mean particle size of 0.21 μm, CR-63, by Ishihara Sangyo Kaisha, Ltd.)

Component c-4: titanium oxide (mean particle size of 0.3 μm, Kronos 2360, by Kronos)

Component c-5: titanium oxide (mean particle size of 0.25 μm, CR-90, by Ishihara Sangyo Kaisha, Ltd.)

Component c-6: titanium oxide (mean particle size of 0.21 μm, PF-691, by Ishihara Sangyo Kaisha, Ltd.)

Component c-7: titanium oxide (mean particle size of 0.21 μm, CR-60, by Ishihara Sangyo Kaisha, Ltd.)

Component c-8: titanium oxide (mean particle size of 0.21 μm, CR-60-2, by Ishihara Sangyo Kaisha, Ltd.)

Component c-9: titanium oxide (mean particle size of 0.25 μm, CR-97, by Ishihara Sangyo Kaisha, Ltd.)

Component c-10: titanium oxide (mean particle size of 0.21 μm, JR-405, by Teika Pharmaceutical Co., Ltd.)

Component c-11: titanium oxide (mean particle size of 0.21 μm, JR-405S, by Teika Pharmaceutical Co., Ltd.)

Component c-12: titanium oxide (mean particle size of 0.26 μm, TCR-10, by Sakai Chemical Industry Co. Ltd.)

Component c-13: zirconium oxide (mean particle size of 1.5 to 2.5 μm, SPZ, by Daiichi Kigenso Kagaku Kogyo Co., Ltd.)

Component d: complex of platinum and 1,3-divinyl-1,1,3,3-tetramethyldisiloxane complex having a platinum concentration of 4.0% by mass Component e-1: organohydrogenpolysiloxane represented by general formula Me$_3$SiO(HmeSiO)$_{50}$OsiMe$_3$ Component e-2: organohydrogenpolysiloxane represented by average structural formula (Hme$_2$SiO$_{1/2}$)$_{60}$(PhSiO$_{3/2}$)$_{40}$ Component f: ethinylcyclohexanol Example 1 and Comparative Example 1

Curable white silicone compositions were prepared by mixing the respective components in the proportions (% by mass) shown in Table 1.

Cracks

The curable white silicone compositions of Example 1 and Comparative Example 1 were applied onto glass substrates, and were cured by being heated for 2 hours at 150° C. to obtain 250 μm thick cured products. The resulting cured products were irradiated with ultraviolet light for 10 hours at a UV illuminance of 140 mW/cm$^2$ using a high-pressure mercury lamp, and the appearance was then checked to see whether there were any cracks. The results are shown in Table 1 below.

TABLE 1

| Component | Example 1 | Comparative Example 1 |
|---|---|---|
| a-1 | 17 · 34 | 17 · 44 |
| a-2 | 34 · 88 | 34 · 88 |
| b-1 | 0 · 1 | — |

TABLE 1-continued

| Component | Example 1 | Comparative Example 1 |
|---|---|---|
| c-1 | 45 · 02 | 45 · 02 |
| e-1 | 2 · 64 | 2 · 64 |
| f | 0 · 02 | 0 · 02 |
| Total | 100 | 100 |
| d | Amount of catalyst | Amount of catalyst |
| Evaluation | | |
| Cracks | no | yes |

Examples 2-3 and Comparative Examples 2-3

Curable silicone compositions were prepared by mixing the respective components in the proportions (% by mass) shown in Table 2.

Reflectance

The curable white silicone compositions of Examples 2-3 and Comparative Examples 2-3 were applied onto glass substrates, and were cured by being heated for 2 hours at 150° C. to obtain 250 μm thick cured products. The optical reflectance of the resulting cured products was determined using the CM-5 Spectrophotometer (by Konica Minolta). The results are shown in Table 2 below.

Light Resistance Test

The curable white silicone compositions of Examples 2-3 and Comparative Examples 2-3 were applied onto glass substrates, and were cured by being heated for 2 hours at 150° C. to obtain 250 μm thick cured products. The resulting cured products were irradiated with ultraviolet light at a UV illuminance of 140 mW/cm$^2$ using a high-pressure mercury lamp, and the time until cracks occurred in the cured products was measured. The results are shown in Table 2 below.

TABLE 2

| Component | Example 2 | Example 3 | Comparative Example 2 | Comparative Example 3 |
|---|---|---|---|---|
| a-1 | 15 · 8 | 15 · 8 | 15 · 9 | 15 · 9 |
| a-2 | 31 · 7 | 31 · 7 | 31 · 7 | 31 · 7 |
| b-1 | 0 · 1 | 0 · 1 | — | — |
| c-1 | 50 | — | 50 | — |
| c-2 | — | 50 | — | 50 |
| e-1 | 2 · 4 | 2 · 4 | 2 · 4 | 2 · 4 |
| f | 0 · 02 | 0 · 02 | 0 · 02 | 0 · 02 |
| Total | 100 | 100 | 100 | 100 |
| d | Amount of catalyst | Amount of catalyst | Amount of catalyst | Amount of catalyst |
| Evaluation | | | | |
| Reflectance (%) | 97 | 96 | 97 | 96 |
| Light resistance (hours) | 20 | 15 | 10 | 8 |

Examples 4 to 15

Cured products were prepared in the same manner as in Example 1 except that component C in Example 1 was changed to the white pigments shown in Table 3 below, and the reflectance and light resistance were evaluated in the same manner. The results are shown in Table 3. In the surface treatment column of the table, Al indicates that titanium oxide was surface-treated with aluminium hydroxide or aluminium oxide (alumina), Si indicates that titanium oxide was surface-treated with silica, and Zr indicates that titanium oxide was surface-treated with zirconium oxide.

TABLE 3

| | Component C | Titanium oxide surface treatment | Reflectance % | Light resistance (hours) |
|---|---|---|---|---|
| Example 1 | c-1 | Al, Si, organic material | 97 | 20 |
| Example 4 | c-2 | — | 93 | 15 |
| Example 5 | c-3 | Al, Si, organic material | 95 | 15 |
| Example 6 | c-4 | Al, Si, organic material | 95 | 20 |
| Example 7 | c-5 | Al, Si | 95 | 15 |
| Example 8 | c-6 | Al, Si, organic material | 95 | 15 |
| Example 9 | c-7 | Al | 95 | 32 |
| Example 10 | c-8 | Al, organic material | 95 | 32 |
| Example 11 | c-9 | Al, Zr | 94 | 32 |
| Example 12 | c-10 | Al | 93 | 32 |
| Example 13 | c-11 | Al, organic material | 93 | 32 |
| Example 14 | c-12 | Al, Zn | 93 | 32 |
| Example 15 | c-13 | — | 91 | 32 |

Example 16, Comparative Example 4

Preparation of cerium-containing phenyl silicone b-2 To a phenylmethyloligosiloxane capped at both ends with silanol groups (represented by average formula: HO(PhMeSiO)$_{5.4}$H) were added a sodium methoxide/methanol solution (28% by mass) in a stoichiometric amount relative to the silanol groups as well as toluene in an amount equivalent to the above phenylmethyloligosiloxane capped at both ends with silanol groups, and the mixture was heated to 110° C. at ambient pressure to distill off the methanol, giving a toluene solution of the corresponding sodium silanolate. Trimethylchlorosilane was then added dropwise at room temperature in an amount corresponding to ½ the stoichiometric amount relative to the silanol group, giving a toluene solution of sodium silanolate represented by the average formula: Me$_3$SiO(PhMeSiO)5.$_4$Na.

The above toluene solution of sodium silanolate was then added dropwise while stirred into a mixture of cerium trichloride, toluene, and methoxyisopropanol, the mixture was stirred for 1 hour at room temperature, and the salt was then filtered off. The filtrate was heated and distilled at reduced pressure to prepare cerium-containing phenyl silicone (b-2) having a cerium content of 9.5% by mass, as determined by fluorescent X-ray analysis.

Curable silicone compositions were prepared by mixing the respective components in the proportions (% by mass) shown in Table 4. The reflectance and heat resistance were evaluated in the same manner as in the above examples and comparative examples. The results are shown in Table 4 below.

TABLE 4

| Component | Example 16 | Comparative Example 4 |
|---|---|---|
| a-3 | 33 | 33 · 5 |
| a-4 | 10 | 10 |
| b-2 | 0 · 5 | — |
| c-1 | 45 | 45 |
| e-2 | 11 · 5 | 11 · 5 |
| Total | 100 | 100 |
| d | Amount of catalyst | Amount of catalyst |
| Evaluation | | |
| Reflectance (%) | 92 | 92 |
| Light resistance (minutes) | 40 | 20 |

INDUSTRIAL APPLICABILITY

The curable white silicone composition of the present disclosure is useful as a reflective material for optical semiconductor devices, particularly optical semiconductor devices such as light-emitting diodes (LEDs), semiconductor lasers, photodiodes, phototransistors, solid-state imaging, and photoemitters and photoreceivers for photocouplers.

The invention claimed is:

1. A curable white silicone composition comprising at least: (A) an organopolysiloxane having at least 2 alkenyl groups per molecule,
   (B) a cerium-containing organopolysiloxane,
   (C) a white pigment, and
   (D) a curing catalyst,
   wherein the content of the (C) white pigment is 10 to 80% by mass with respect to the total mass of the composition.

2. A curable white silicone composition according to claim 1, wherein the concentration of cerium atoms in the (B) cerium-containing organopolysiloxane is 0.5 to 1,000 ppm.

3. A curable white silicone composition according to claim 2, wherein the (C) white pigment has a mean particle size of 0.1 to 5 μm.

4. A curable white silicone composition according to claim 3, wherein the (A) organopolysiloxane comprises a resinous organopolysiloxane that is represented by

   (A-2) average unit formula:

(in the formula, $R^1$ are the same or different optionally halogen-substituted monovalent hydrocarbon groups, except that at least two $R^1$ are alkenyl groups, f is an integer from 5 to 1,000, g is an integer from 5 to 1,000, X is a hydrogen atom or an alkyl group, and h is an integer from 0 to 10).

5. A curable white silicone composition according to claim 4, wherein the (A) organopolysiloxane comprises a resinous organopolysiloxane and a linear organopolysiloxane such that the linear organopolysiloxane/resinous organopolysiloxane content ratio is 1 or more.

6. A curable white silicone composition according to claim 2, characterized in that the (C) white pigment comprises titanium oxide that has not been surface treated with silica.

7. A curable white silicone composition according to claim 1, wherein the (C) white pigment has a mean particle size of 0.1 to 5 μm.

8. A curable white silicone composition according to claim 7, characterized in that the (C) white pigment comprises titanium oxide that has not been surface treated with silica.

9. A curable white silicone composition according to claim 1, characterized in that the (C) white pigment comprises titanium oxide that has not been surface treated with silica.

10. A curable white silicone composition according to claim 1, wherein the (D) curing catalyst comprises a hydrosilylation reaction catalyst.

11. A curable white silicone composition according to claim 1, wherein the (A) organopolysiloxane comprises a resinous organopolysiloxane.

12. A curable white silicone composition according to claim 11, wherein the resinous organopolysiloxane is represented by

   (A-2) average unit formula:

(in the formula, $R^1$ are the same or different optionally halogen-substituted monovalent hydrocarbon groups, except that at least two $R^1$ are alkenyl groups, f is an integer from 5 to 1,000, g is an integer from 5 to 1,000, X is a hydrogen atom or an alkyl group, and h is an integer from 0 to 10).

13. A curable white silicone composition according to claim 12, wherein the (A) organopolysiloxane comprises a resinous organopolysiloxane and a linear organopolysiloxane such that the linear organopolysiloxane/resinous organopolysiloxane content ratio is 1 or more.

14. A curable white silicone composition according to claim 1, wherein the (A) organopolysiloxane comprises a resinous organopolysiloxane and a linear organopolysiloxane such that the linear organopolysiloxane/resinous organopolysiloxane content ratio is 1 or more.

15. A reflective material for an optical semiconductor device, comprising the cured product of the curable white silicone composition according to claim 1.

16. An optical semiconductor device, comprising the reflective material for an optical semiconductor device according to claim 15.

\* \* \* \* \*